United States Patent [19]
Borresen

[11] Patent Number: 4,692,198
[45] Date of Patent: Sep. 8, 1987

[54] METHOD OF PRINTING A PATTERN ON A SURFACE RECEPTIVE TO SUBLIMATION PRINTING

[75] Inventor: Peter A. Borresen, Vejle, Denmark

[73] Assignee: A/S Modulex, Billund, Denmark

[21] Appl. No.: 694,828

[22] PCT Filed: May 16, 1984

[86] PCT No.: PCT/DK84/00039

§ 371 Date: Jan. 16, 1985

§ 102(e) Date: Jan. 16, 1985

[87] PCT Pub. No.: WO84/04496

PCT Pub. Date: Nov. 22, 1984

[30] Foreign Application Priority Data

May 17, 1983 [DK] Denmark ........................... 2193/83

[51] Int. Cl.⁴ ........................ B44C 1/17; B32B 31/00; D06P 1/02

[52] U.S. Cl. .................................. 156/235; 156/240; 156/249; 156/267; 428/914; 8/468

[58] Field of Search ............... 156/248, 240, 267, 268, 156/230, 234, 235, 238, 240, 241, 249, 257, 297; 428/41, 914; 8/471, 468

[56] References Cited

U.S. PATENT DOCUMENTS

| | | | |
|---|---|---|---|
| 4,078,886 | 3/1978 | De Fago et al. | 8/471 |
| 4,115,412 | 9/1978 | Hohmann et al. | 8/471 |
| 4,379,017 | 4/1983 | Barta | 156/230 |
| 4,604,153 | 8/1986 | Melbye | 156/235 |

FOREIGN PATENT DOCUMENTS

| | | |
|---|---|---|
| 2116032 | 10/1971 | Fed. Rep. of Germany . |
| 2452777 | 7/1975 | Fed. Rep. of Germany . |
| 2847702 | 2/1981 | Fed. Rep. of Germany . |
| 56-2187 | 1/1981 | Japan . |
| 2013574 | 8/1979 | United Kingdom . |

*Primary Examiner*—Michael Ball
*Assistant Examiner*—Louis Falasco
*Attorney, Agent, or Firm*—Kane, Dalsimer, Kane, Sullivan & Kurucz

[57] ABSTRACT

A method of printing a pattern on a surface receptive to sublimation dye, in which (a) the back of a carrier foil (1) provided with sublimation dye is caused to adhesively contact an auxiliary carrier (4) by means of an adhesive (5) of greater adhesiveness to the auxiliary carrier (4) than to the carrier foil (1), (b) the pattern to be transferred is cut or punched in mirror-reversed form in the carrier foil (1) without cutting through the auxiliary carrier (4), (c) excess carrier foil (11) is released from the auxiliary carrier (4), and (d) the auxiliary carrier (4) with the applied positive or negative cut or punched pattern (10) is caused to adhesively contact the surface, is pressed and heated. The sublimation foil (9) consists of a carrier foil (1) of paper or plastics whose front is provided with a layer of sublimation dye and whose back is provided with an auxiliary carrier (4) by means of an adhesive (5) of greater adhesiveness to the auxiliary carrier (4). The method enables simplified mounting of composite patterns as it directly provides the desired positioning and spacing of the characters.

1 Claim, 2 Drawing Figures

METHOD OF PRINTING A PATTERN ON A SURFACE RECEPTIVE TO SUBLIMATION PRINTING

Figure 1:
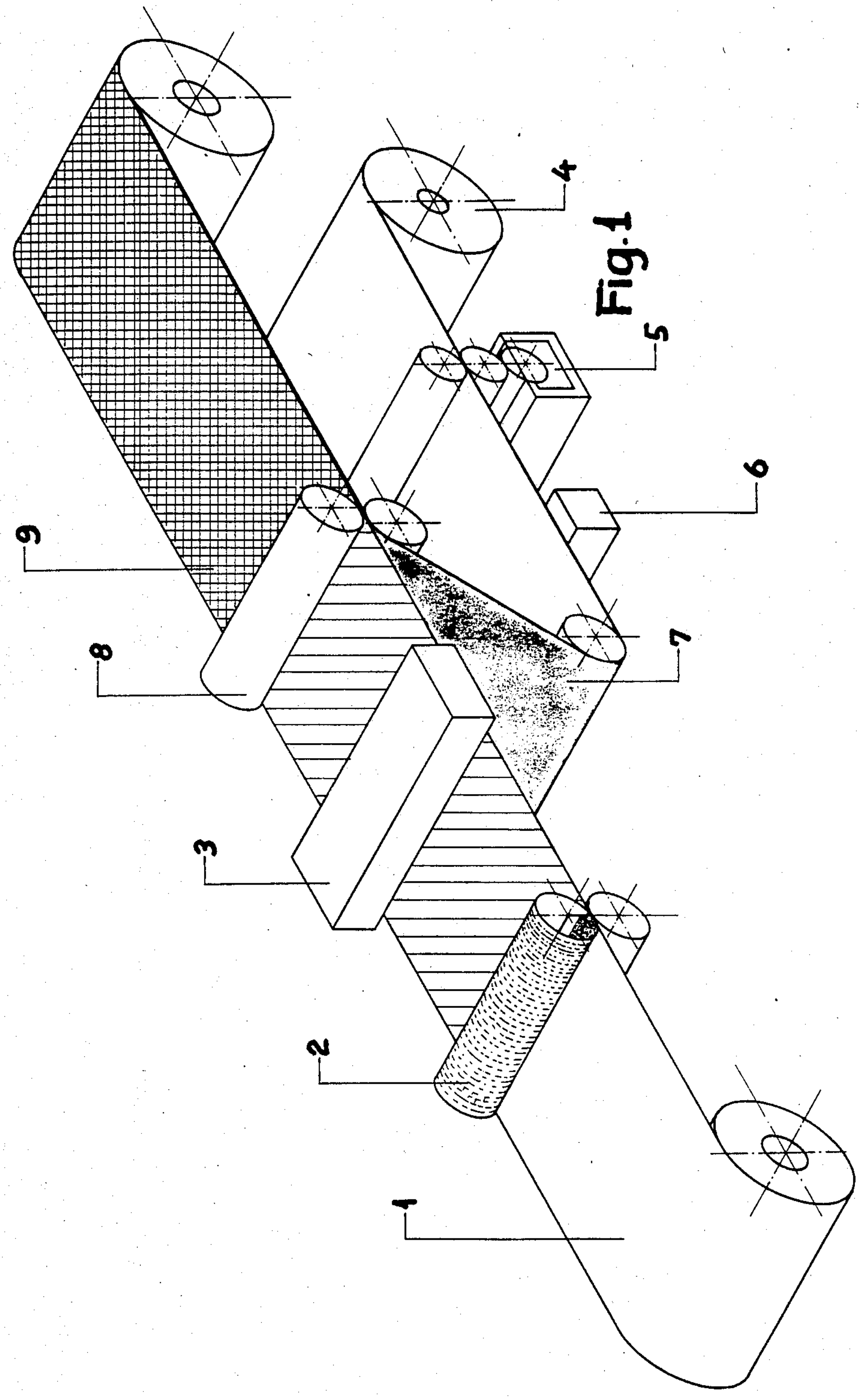

The present invention relates to a method of printing a pattern on a surface receptive to sublimation printing, in which the pattern cut or punched in mirror-reversed form from a carrier foil provided with sublimation dye is caused to contact the surface by means of an auxiliary carrier and is heated for the transfer of the pattern to the surface. The term "pattern" as used herein includes arbitrary shapes, such as letters, numbers, symbols, ornaments and the like.

A method of this type is described in the German Patent Specification No. 2,847,702, according to which a mounting adhesive, provided with a cover foil of silicon paper, is applied to the back of the carrier foil.

According to this patent specification, the desired pattern is cut or punched in mirror-reversed form from the cover foil. After removal of the carrier foil the pattern is manually placed mirror-reversed on a separate auxiliary carrier, which may e.g. be a sheet of paper, by means of the mounting adhesive. If the pattern is composed of several characters, these are placed one by one on the auxiliary carrier in the desired configuration or with the desired spacing. Then the auxiliary carrier with the applied pattern is contacted with the surface to which the pattern is to be transferred and is heated conventionally, e.g. by means of an iron so that the dye sublimes into the surface.

This method lends itself to the transfer of individual characters, but is cumbersome in case of composite patterns, such as sign legends and the like, because the characters forming the legends in mirror-reversed form on the auxiliary carrier are to be placed manually with great care.

The method of the above-mentioned patent specification moreover shares a drawback with other methods based on heat transfer of sublimation dye, viz. frequent formation of shadows on the surface to be decorated because the carrier with the applied pattern is not in complete contact with the surface.

The object of the present invention is to provide a method which is not vitiated by these drawbacks and which thus ensures perfect contact to the surface and obviates the previously necessary intermediate manual transfer of characters to an auxiliary carrier, and which moreover enables transfer of both positive and negative patterns composed of several characters.

This is achieved by the method of the invention which is characterized in that (a) the back of the carrier foil provided with sublimation dye is caused to adhesively contact an auxiliary carrier by means of an adhesive of greater adhesiveness to the auxiliary carrier than to the carrier foil, (b) the pattern to be transferred is cut or punched in mirror-reversed form in the carrier foil without cutting through the auxiliary carrier, (c) excess carrier foil is released from the auxiliary carrier, and (d) the auxiliary carrier with the applied positive or negative cut or punched pattern is caused to adhesively contact the surface, is pressed and heated.

The invention also relates to a sublimation foil with an auxiliary carrier for use in this method, said sublimation foil being characterized in that it consists of a carrier foil of paper or plastics whose front is provided with a layer of sublimation dye and whose back is provided with an auxiliary carrier by means of an adhesive of greater adhesiveness to the auxiliary carrier.

The method of the invention enables decoration of surfaces of all possible materials receptive to sublimation dyes and capable of resisting the heating which is necessary for the sublimation and which depends upon the sublimation temperature (range) of the selected dye, in particular. Examples of such materials include (1) textiles of synthetic and/or natural fibres optionally treated to ensure the required heat stability, (2) thermoplastic materials, such as polystyren, polyethylene, polypropylene, polyvinyl chloride, vinyl chloride or vinyl acetate copolymers, styrene butadiene copolymers or ABS polymers, polyamides, acrylic polymers, such as polyacrylonitrile and polyacrylates, polyesters, polyurethanes, etc., (3) thermosetting materials such as epoxy resins and epoxy composite polymerisates, amino plastics, such as melamine plastics and carbamide plastics, and a large number of plastics materials which can be made heat-settable by cross-linking, such as polyesters, polyacrylates, polyurethanes, etc.

Even the objects to be decorated may be made of the above-mentioned plastics materials or may be provided with coatings of such materials, e.g. by lacquering.

According to their nature and use the plastics materials may be cross-linked or not, reinforced, e.g. with glass fibres, and they may be pigmented, if desired.

Examples of decoration objects are:

Injection moulded or extruded objects of thermoplastic materials, such as glass fibre reinforced polyesters.

Aluminium sheets lacquered with a pigmented ground lacquer, e.g. a polyester of polyurethane lacquer, and a transparent top coat lacquer, e.g. a polyurethane lacquer.

Self-adhesive polyester or acrylic foil.

Textiles of cotton or wool admixed with synthetic fibres.

Figure 2:
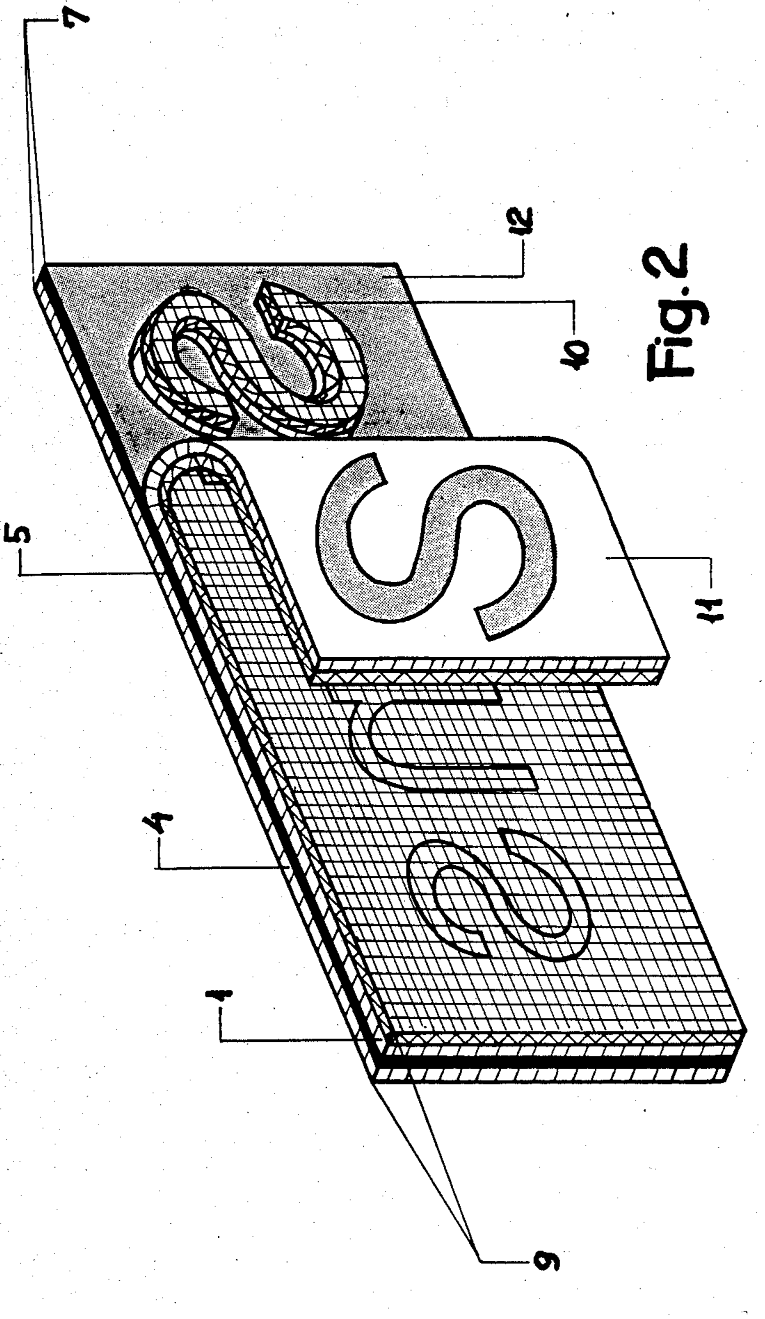

The various details in the method of the invention and the sublimation foil used will be explained more fully below with reference to the drawing, in which FIG. 1 shows an embodiment for the manufacture of a sublimation foil with an auxiliary carrier, and FIG. 2 shows a foil according to FIG. 1 after cutting of the desired pattern, excess carrier foil being partly released from the auxiliary carrier.

In FIG. 1 the numeral 1 designates the carrier foil which is to be of a grade suitable for application of liquid sublimation dye, such as glazed paper, or cross-linked plastics foils e.g. of polyesters, in particular polyethylene terephthalate (Melinex®, Mylar®), melamine or acrylic plastics.

Sublimation dye is applied preferably by rotating screen printing as illustrated by the roll arrangement 2 or by offset printing, photogravure or serigraphy.

The preferred sublimation dye type is serigraphy dyes, e.g. those available from Ciba-Geigy, Widerhold or Lithotex.

After the application of dye the carrier foil is dried by the drier 3 to prevent permeation of the dye to the back of the foil.

The auxiliary carrier 4, which may be a foil of the same grade as the carrier foil 1, is provided with adhesive as illustrated by the roll arrangement 5.

The employed adhesive must not dissolve or enter into the sublimation dye, and it must be temperature resistant from 0° and up to the sublimation temperature used, in practice up to about 220° C., for a period of time sufficient for the sublimation of the dye to take place, in practice at least 2 minutes. The employed adhesive must moreover not adhere permanently to the back of the carrier foil, but must admit of being firmly fixed to the auxiliary carrier. This fact must of course also be taken into consideration in the selection of foil grades for auxiliary carriers of carrier foil. The above-mentioned criteria are met e.g. by adhesives of the polyurethane, acrylic or silicon type which are preferably cross-linked.

The adhesive is heat-set at 6 so as to be firmly fixed to the auxiliary carrier 4.

The foil 7 is then ready to be assembled with the carrier foil.

Instead of the treatment illustrated at 4, 5 and 6 certain commercially available finished adhesives may be used, if desired, e.g. the heat application tape available from 3M.

The back of the carrier foil 1 is adhered to the auxiliary carrier 7 by means of the fixing rolls 8.

The assembled foil laminate 9 is now placed e.g. in a flat or round plotter whose guide head is provided with a knife or laser beam cutter unit to produce characters or patterns. The plotters are coupled to a computer which is programmed to the desired result.

The above-mentioned result can also be obtained by traditional punching tools, which may likewise be programmed, if desired.

Characters or patterns are punched or cut in mirror-reversed form and without cutting through the auxiliary carrier as illustrated at 10 in FIG. 2.

According to whether positive or negative characters or patterns are desired, excess carrier foil is removed as illustrated at 11 in FIG. 2, which shows a positive pattern.

After removal of excess foil 11 an adhesive face 12 appears, which may in turn be used for fixing the composite characters or patterns on a decoration object which is designed for the purpose and to which the remaining sublimation dyes are to be transferred. The transfer takes place in a manner known per se, e.g. in a heat press at 180° to 220° C.

I claim:

1. A method of printing a pattern on a surface receptive to sublimation dye comprising the steps of (a) providing a sublimation foil comprising a carrier foil having a layer of sublimation dye on its front side, its back side being bonded to an auxiliary carrier by means of an adhesive of greater adhesiveness to the auxiliary carrier than the carrier foil;

(b) cutting or punching the pattern to be transferred in mirror-reversed form in said carrier foil without cutting or punching through the auxiliary carrier;

(c) removing the excess carrier foil from the auxiliary carrier so as to expose the adhesive surrounding a positive pattern or surrounded by a negative pattern;

(d) contacting the surface with the auxiliary carrier whereby said exposed adhesive surrounded by or surrounding the pattern fixes said auxiliary carrier to the surface; and, (e) thereafter heating said dye under pressure to transfer said pattern to said surface.

* * * * *